(12) United States Patent
Oehler et al.

(10) Patent No.: US 11,466,761 B2
(45) Date of Patent: Oct. 11, 2022

(54) ELECTROMECHANICAL BRAKE PRESSURE GENERATOR INCLUDING A THREADED DRIVE SYSTEM

(71) Applicant: Robert Bosch GmbH, Stuttgart (DE)

(72) Inventors: Claus Oehler, Karlsruhe (DE); Mark Boehm, Lehrensteinsfeld (DE); Martin Uhlig, Ilsfeld (DE)

(73) Assignee: Robert Bosch GmbH, Stuttgart (DE)

( * ) Notice: Subject to any disclaimer, the term of this patent is extended or adjusted under 35 U.S.C. 154(b) by 73 days.

(21) Appl. No.: 16/854,158

(22) Filed: Apr. 21, 2020

(65) Prior Publication Data

US 2020/0340560 A1    Oct. 29, 2020

(30) Foreign Application Priority Data

Apr. 25, 2019  (DE) .......................... 102019205973.2
Mar. 5, 2020   (DE) .......................... 102020202843.5

(51) Int. Cl.
*B60T 13/74*    (2006.01)
*F16H 25/20*    (2006.01)
(Continued)

(52) U.S. Cl.
CPC ........ *F16H 25/2025* (2013.01); *B60T 13/662* (2013.01); *B60T 13/745* (2013.01); *B60T 13/746* (2013.01); *F16H 25/24* (2013.01)

(58) Field of Classification Search
CPC .. B60T 13/74; B60T 13/745; F16H 2025/204; F16H 25/2021; F15B 15/06; F15B 7/08; F16D 2125/40
See application file for complete search history.

(56) References Cited

U.S. PATENT DOCUMENTS 5,302,008 A * 4/1994 Miyake ................. B60T 8/4072
                                                  303/14
5,454,631 A * 10/1995 Frieling ................. B60T 8/489
                                                  303/113.2
(Continued)

FOREIGN PATENT DOCUMENTS

DE    102017214859 A1 *  2/2019  ............ B60T 13/745
DE    102019206754 A1 * 11/2020  ............ B60T 13/745
WO       2017045804 A1    3/2017

*Primary Examiner* — Bradley T King
(74) *Attorney, Agent, or Firm* — Norton Rose Fulbright US LLP; Gerard Messina

(57) ABSTRACT

An electromechanical brake pressure generator for a hydraulic braking system of a vehicle, including at least one threaded drive system. The system includes a hydraulic piston, a spindle and a spindle nut, which cooperate via a thread, and includes an electromotive drive, via which the spindle and the spindle nut are rotatable relative to one another. The hydraulic piston of the piston/cylinder unit at least partially radially surrounds the spindle and the spindle nut, the hydraulic piston being accommodated in a hydraulic cylinder of the piston/cylinder unit. An anti-twist protection is formed by a recess extending in the axial direction and forming a sliding surface, and by a sliding element protruding into the recess. The sliding element rests against a planar contact area of the sliding surface so that the hydraulic piston is secured against twisting and is axially displaceable by a rotation of the spindle or the spindle nut.

12 Claims, 5 Drawing Sheets

(51) Int. Cl.
  *F16H 25/24* (2006.01)
  *B60T 13/66* (2006.01)

(56) References Cited

U.S. PATENT DOCUMENTS

| | | | | |
|---|---|---|---|---|
| 6,079,797 | A * | 6/2000 | Ganzel | B60T 8/4018 |
| | | | | 303/116.1 |
| 7,562,594 | B2 * | 7/2009 | Nagai | F16H 25/2015 |
| | | | | 74/89.23 |
| 8,656,798 | B2 * | 2/2014 | Kawahara | F16H 25/20 |
| | | | | 74/89.32 |
| 2012/0160043 | A1 * | 6/2012 | Drumm | F16H 25/20 |
| | | | | 74/89.23 |
| 2015/0285348 | A1 * | 10/2015 | Ikeda | F16H 25/2204 |
| | | | | 74/89.36 |
| 2016/0251007 | A1 * | 9/2016 | Ko | F04B 35/01 |
| | | | | 417/374 |
| 2017/0030445 | A1 * | 2/2017 | Weh | F15B 15/14 |
| 2018/0009425 | A1 * | 1/2018 | Feigel | B60T 13/145 |
| 2018/0029575 | A1 * | 2/2018 | Malwitz | F16D 65/14 |
| 2019/0017502 | A1 * | 1/2019 | Ohm | F04B 17/03 |
| 2019/0100172 | A1 * | 4/2019 | Lee | B60T 7/042 |
| 2019/0100188 | A1 * | 4/2019 | Lee | B60T 8/4018 |
| 2020/0298813 | A1 * | 9/2020 | Lee | B60T 13/145 |
| 2020/0331446 | A1 * | 10/2020 | Yun | F16H 25/24 |
| 2020/0339091 | A1 * | 10/2020 | Boehm | B60T 13/745 |
| 2020/0340563 | A1 * | 10/2020 | Boehm | B60T 7/042 |
| 2020/0361434 | A1 * | 11/2020 | Weh | B60T 8/40 |
| 2021/0018079 | A1 * | 1/2021 | Winkler | F04B 9/02 |

* cited by examiner

ELECTROMECHANICAL BRAKE PRESSURE GENERATOR INCLUDING A THREADED DRIVE SYSTEM

CROSS REFERENCE

The present application claims the benefit under 35 U.S.C. § 119 of German Patent Application Nos. DE 102019205973.2 filed on Apr. 25, 2019 and DE 102020202843.5 filed on Mar. 5, 2020, each of which is expressly incorporated herein by reference in its entirety.

FIELD

The present invention relates to an electromechanical brake pressure generator for a hydraulic braking system of a vehicle. This electromechanical brake pressure generator includes, in particular, a threaded drive system for converting a drive-side rotary motion into a translatory motion for actuating the piston of a piston/cylinder unit.

BACKGROUND INFORMATION

The foot force of the driver is mostly not sufficient for braking motor vehicles, so that these are usually equipped with a brake booster. Conventional brake boosters in general operate with the aid of a vacuum generated by the internal combustion engine. The pressure difference between the engine pressure and the ambient pressure is used in the process to apply a boosting force onto the piston rod of the piston/cylinder unit, in addition to the foot force of the driver.

Alternative brake pressure buildup devices are needed for future drive concepts of motor vehicles since a vacuum is no longer available to operate a conventional vacuum brake booster. For this purpose, the electromechanical brake pressure generators of interest here were developed.

The actuating force at the master brake cylinder is generated with the aid of an electric motor. Such electromechanical brake pressure generators may not only be used to provide an auxiliary force, but in brake by wire systems also to single-handedly provide the actuating force. Electromechanical brake pressure generators are thus of advantage, in particular, with respect to autonomous driving.

A conventional electromechanical brake booster is described in PCT Application No. WO 2017/045804 A1, which is shown in FIG. 1. In contrast, the present invention is directed to an electromechanical brake pressure generator, which is able to apply a braking force independently of an actuation of the brake pedal. The conventional brake booster 1 includes a spindle nut 2 and an electric motor (not shown) with the aid of which spindle nut 2 may be made to carry out a rotation via a spur gear 3. Spindle nut 2 is operatively engaged with a spindle 4, which is why spindle 4 may be made to carry out a translatory motion along its spindle axis 5 with the aid of spindle nut 2 made to carry out the rotation. To prevent spindle 4 from co-rotating as a result of the rotation of spindle nut 2, brake booster 1 includes a bearing system 6 to which spindle 4 is fixedly connected.

Bearing system 6 includes a bracket 6a, on the edges of which two sliding bearings 6b are situated. Sliding bearings 6b run on tie rods 7 which extend essentially in parallel to spindle axis 5. Spindle 4 is movable in the axial direction with the aid of this bearing system 6 and is secured against twisting.

It is an object of the present invention to provide an electromechanical brake pressure generator including a threaded drive system which ensures a technically simple, but reliable protection against twisting.

SUMMARY

The object may be achieved by an example electromechanical brake pressure generator for a hydraulic braking system in accordance with the present invention. Advantageous refinements of the present invention are described herein.

The present invention provides an electromechanical brake pressure generator for a hydraulic braking system of a vehicle. This electromechanical brake pressure generator includes at least one threaded drive system for converting a rotary motion into a translatory motion for the brake pressure generation. The threaded drive system includes a spindle and a spindle nut, which cooperate via a thread and are rotatable relative to one another with the aid of a drive, and a hydraulic piston, which at least partially radially surrounds the spindle and the spindle nut and which is axially displaceable by a rotation of the spindle or the spindle nut.

The threaded drive system furthermore includes a housing, which forms a hydraulic cylinder, corresponding to the hydraulic piston, in which the hydraulic piston is accommodated. The threaded drive system additionally includes an anti-twist protection which is formed by the hydraulic cylinder and the hydraulic piston and with the aid of which the hydraulic piston is secured against twisting during a rotation of the spindle or the spindle nut. The anti-twist protection is formed by a recess extending in the axial direction and forming a sliding surface, and a sliding element protruding into the recess. The sliding element is designed in such a way that the sliding element rests extensively against the sliding surface on a contact area.

A threaded drive system within the scope of the present invention shall be understood to mean both a pure spindle drive, in which the spindle nut is in direct contact with the spindle, and a ball screw. A ball screw is a helical gear including balls inserted between the spindle and the spindle nut. Both parts have a helical groove, which together form a helical tube filled with balls. The form-locked connection in the thread transversely to the helical line does not take place between the thread groove and tongue, as is the case with the pure spindle drive, but with the aid of balls.

The hydraulic piston rests directly against the brake fluid so that pressure may be applied to the brake fluid with the aid of the hydraulic piston. The hydraulic piston preferably has a pot-shaped design. Preferably, a portion of the spindle and a portion of the spindle nut engage in the pot-shaped recess.

Within the meaning of the present invention, a twisting shall be understood to mean a rotary motion about an axial axis of the corresponding element to be secured. In the present invention, both the spindle and the spindle nut may be secured against twisting. This is dependent on whether the spindle or the spindle nut is driven, so that the non-driven element is secured against twisting, whereby the rotary motion may be converted into a translatory motion. As a result, the non-driven element is axially displaceable.

The recess extending in the axial direction runs along the movement axis of the axially moving element. A form-locked joint in the direction of the twist is preferably formed by the recess and the sliding element protruding into the recess, so that twisting is prevented. The sliding surface is, in particular, a surface which is specially designed for a sliding motion. For example, the sliding surface is particularly smooth and does not include any protrusions. In this way, good sliding properties may be provided.

A contact area shall, in particular, be understood to mean the area in which the sliding element is in direct contact with the sliding surface. This contact area is not point-shaped, but planar, so that a line contact is formed along with the movement. The planar contact forms, in particular, a strip-shaped contact with the sliding surface along with the movement. The planar contact reduces the contact pressure. As a result, the force is not concentrated on a point-shaped contact, but is distributed on the planar contact. In this way, the wear between the sliding surface and the sliding element is also reduced.

Preferably, two anti-twist protections are formed in each case, which have an angle of 180° with respect to one another, i.e., are situated opposite one another. Anti-twist protections thus situated secure the element to be secured against twisting sufficiently against twisting.

In one preferred embodiment of the present invention, the spindle is non-rotatably connected to the hydraulic piston, so that the hydraulic piston and the spindle are axially displaceable with a rotation of the spindle nut. In one further preferred embodiment of the present invention, the hydraulic piston is non-rotatably connected to the spindle nut, so that the hydraulic piston and the spindle nut are axially displaceable with a rotation of spindle. In this way, two different concepts may be provided, so that an optimal system is selectable for the corresponding use.

The anti-twist protection is preferably formed with the aid of a tongue-and-groove joint. A tongue-and-groove joint is, in particular, characterized by an exactly matched groove and a tongue accommodatable therein. The tongue and the groove engage one another in a form-locked manner. The tongue-and-groove joint may, for example, be formed at components to be secured with respect to one another as the tongue and the groove. The tongue-and-groove joint may be created, for example, by embossing, broaching, machining, milling, butting or, in particular, cold forming. Such tongue-and-groove joints are thus easily and economically implementable.

In one advantageous refinement of the present invention, the sliding element has a convex design in an axial direction of the spindle on at least one axial edge area. This means that the axial edge area situated in the axial direction has a smaller thickness in the circumferential direction than in a core area of the sliding element. As a result, the accordingly convexly shaped axial edge area does not rest against the sliding surface. During a corresponding tilting of the piston, no edge loading thus takes place. As a result, a planar contact between the sliding element and the sliding surface may be ensured, even with tilting of the piston.

The sliding element advantageously has a convex design in a radial direction of the spindle on at least one radial edge area. This means that the radial edge area situated in the radial direction has a smaller thickness in the circumferential direction than in a core area of the sliding element. As a result, the accordingly convexly shaped radial edge area does not rest against the sliding surface. During a corresponding tilting of the piston, thus no edge loading takes place. Similarly to the axial edge area, an extensive contact between the sliding element and the sliding surface may thus be ensured, even with tilting of the piston.

According to one advantageous embodiment of the present invention, the sliding element additionally includes a contact shoe, which is situated on the outer side and is in contact with the sliding surface. The contact shoe preferably rests planarly against the sliding surface so that the sliding contact with the sliding surface is established thereby. The planar contact with the sliding surface reduces the contact pressure. The contact shoe is preferably made of a material different from the hydraulic piston. The contact shoe preferably completely surrounds the sliding element. As a result of the contact shoe, the material of the hydraulic piston may be selected regardless of sliding properties. The material of the contact shoe is advantageously selected in such a way that good sliding pairing is ensured between the material of the sliding surface and that of the contact shoe.

In one further preferred refinement of the present invention, the contact shoe is made of a plastic material. Moreover, an arbitrary shape is easily manufacturable. As a result, such a contact shoe may be implemented easily and economically. In addition, plastic material is light and cost-effective. In the field of plastic materials, there is also a large selection of plastic materials having specific properties, so that a suitable plastic material is locatable for the intended use.

The contact shoe and an inner sliding element portion of the sliding element advantageously rest against one another in the axial direction of the spindle via a planar surface and a convex surface. In other words, one surface on the sliding element or the contact shoe has a convex design and faces the other component. In contrast, one surface of the other component, which rests against the convex surface, has a planar design. The planar surface is preferably designed in parallel to the sliding surfaces. The convex or the planar surfaces are situated at both sides of the sliding element oriented toward the sliding surface.

The convex surface and the planar surface ensure that a tilting of the hydraulic piston is possible, without resulting in edge loading. The sliding element and the contact shoe thus rest planarly against one another even during tilting. The contact pressure and thus the wear are accordingly reduced. The loading on the sliding element and the contact shoe is thereby reduced.

In one further advantageous embodiment, the sliding surface is formed by a sliding rail introduced into the recess. The material of the recess formed by the housing is preferably different from that of the sliding rail. The sliding rail may thus preferably be introduced as an additional part into the recess. As a result of the different material, it is possible to use a material for the housing which has optimal properties with respect to strength, for example, for the function of the housing. However, the function of the sliding rail is to have a good sliding property. The material for the sliding rail may thus be selected in such a way that optimal sliding properties are ensured. Since the sliding rail is supported by the housing, the requirements with regard to the strength of the sliding rail are considerably lower.

The sliding rail is preferably made of plastic. Any conventional plastic may be used as the plastic. This sliding rail manufactured from plastic is preferably introduced into the recess as a separate part. It is also possible that the sliding rail is manufactured by molding the plastic onto walls of the recess. The plastic used is, in particular, plastic which has good sliding properties. In this way, sufficient sliding properties may still be provided even in the case of dry running, i.e., when lubricant is absent. Plastic has, in particular, the advantage that it is light and costs little. Such a sliding rail made up of plastic is also easily, and thus economically, manufacturable.

The sliding element is preferably made from a light metal alloy. Light metal alloys shall be understood to mean alloys whose density is less than 5 g/cm$^3$. A light metal alloy is characterized by a relatively high strength, at a comparatively low dead weight. For example, aluminum alloys, magnesium alloys, titanium alloys or beryllium alloys are used as light metal alloys.

The sliding element is preferably made from an aluminum alloy. Particularly preferably, the hydraulic piston which forms the sliding element is manufactured from the same aluminum alloy. A component made up of an aluminum alloy has the advantage that it is light and ensures good heat dissipation. In addition, the sliding element, in particular in conjunction with a sliding rail made up of plastic, forms an advantageous material pairing, which is improved, in particular, with respect to the wear and the dry running.

The present invention furthermore provides a vehicle including an example electromechanical brake pressure generator for a hydraulic braking system. Such a vehicle allows the advantages described with respect to the electromechanical brake pressure generator to be achieved. In one preferred embodiment, this vehicle may be an automated or completely autonomous vehicle.

Exemplary embodiments of the present invention are shown in the figures and are described in greater detail below.

DETAILED DESCRIPTION OF EXAMPLE EMBODIMENTS

Figure 1:
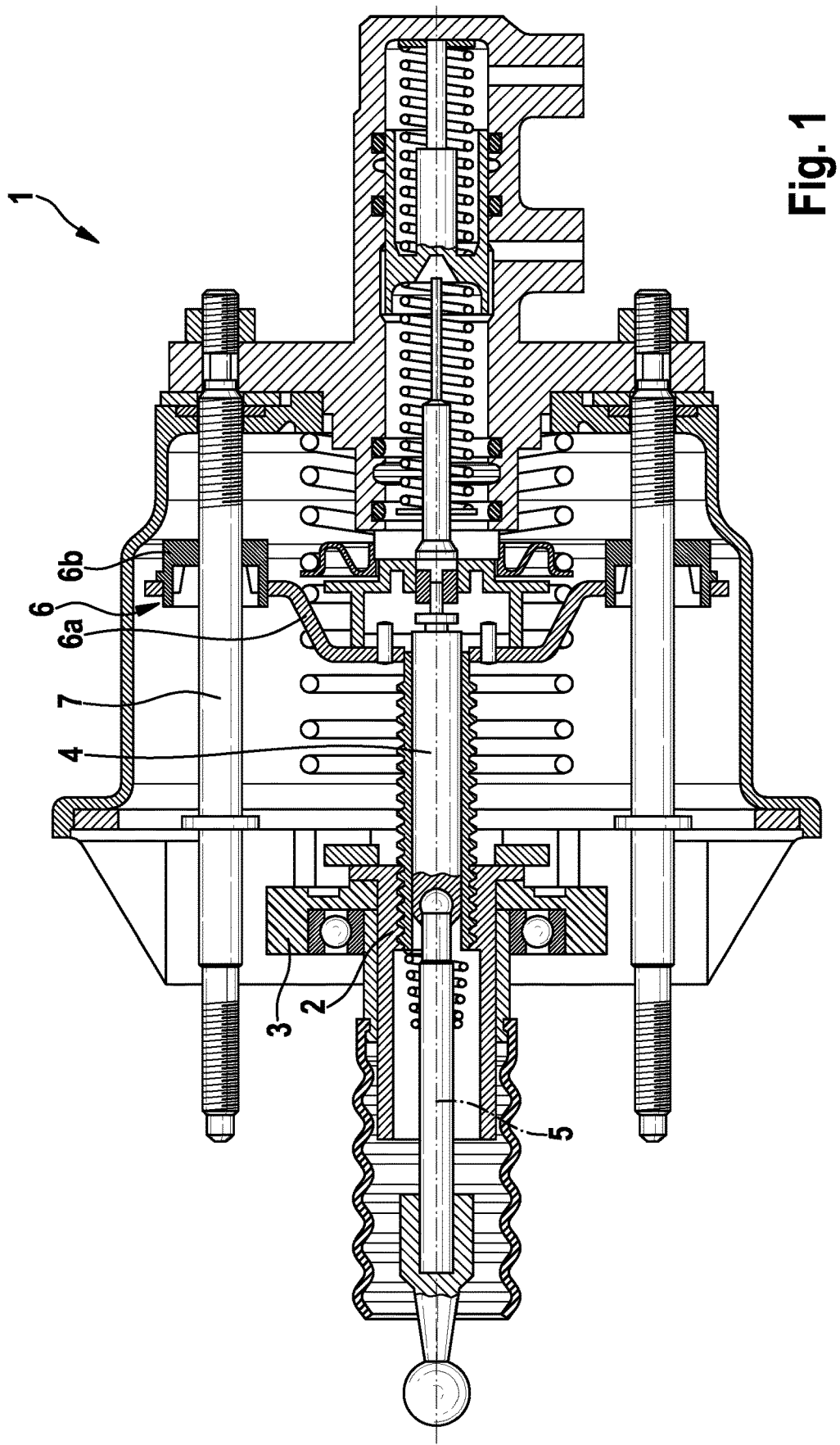
FIG. 1 shows an illustration of an electromechanical brake booster from the related art.
Figure 2:
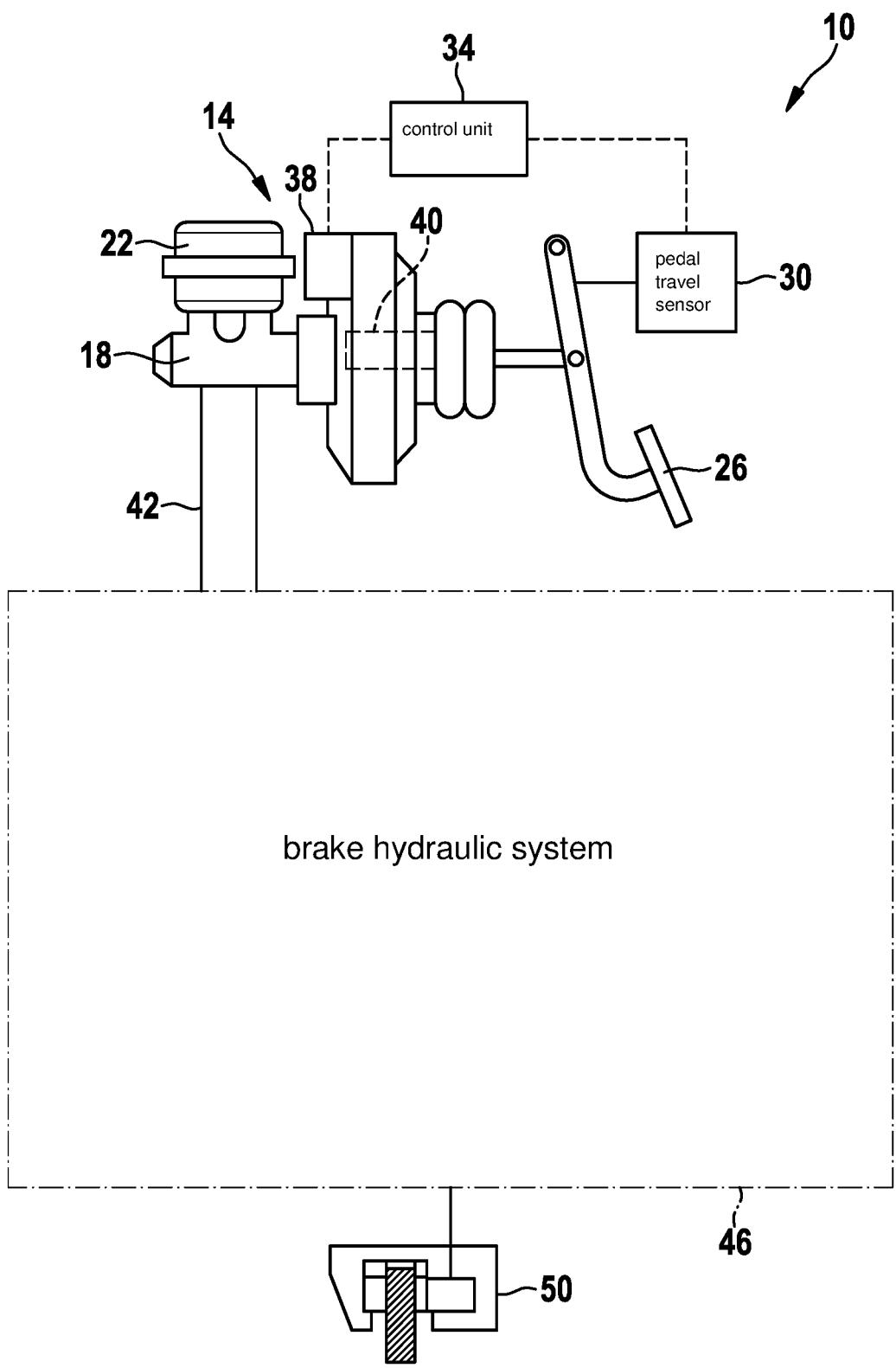
FIG. 2 shows a schematic illustration of a hydraulic braking system for a vehicle including an electromechanical brake pressure generator.

FIG. 2 shows a schematic illustration of a hydraulic braking system 10 for a vehicle including an electromechanical brake pressure generator 14. Hydraulic braking system 10 includes electromechanical brake pressure generator 14. This brake pressure generator 14 includes a piston/cylinder unit 18 which is supplied with brake fluid via a brake fluid reservoir 22.

Piston/cylinder unit 18 may be activated by a brake pedal 26 actuated by the driver, and the resulting brake pedal travel is measured by a pedal travel sensor 30 and forwarded to a control unit 34. Even though FIG. 2, in principle, shows a brake booster. Here, the brake pedal travel is measured by pedal travel sensor 30. A brake pressure generation without a brake pedal travel is also possible, so that the vehicle is also breakable in the autonomous driving state.

Based on the measured brake pedal travel, control unit 34 generates a control signal for an electric motor 38 of brake pressure generator 14. Electric motor 38, which is connected to a gearbox (not shown) of brake pressure generator 14, boosts the braking force input by brake pedal 26 within the scope of a decoupled system in accordance with the control signal. For this purpose, a threaded drive system 40 situated in brake pressure generator 14 is activated by electric motor 38 in accordance with the actuation of brake pedal 26 so that the rotary motion of electric motor 38 is converted into a translatory motion.

With the aid of brake pressure generator 14, the brake fluid present in piston/cylinder unit 18 is pressurized by the actuation of brake pedal 26. This brake pressure is forwarded to a brake hydraulic system 46 via brake lines 42. Brake hydraulic system 46, which is only shown as a box here, is formed by various valves and other components for forming a, for example, electronic stability program (ESP). Brake hydraulic system 46 is additionally connected to at least one wheel brake unit 50 so that a braking force may be applied to wheel brake unit 50 by a corresponding switching of valves.

Figure 3:
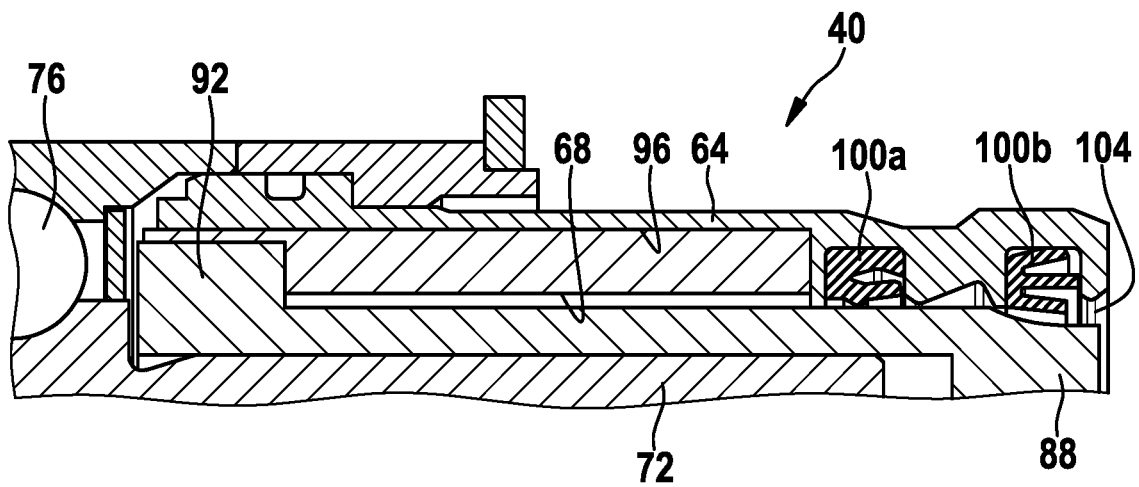
FIG. 3 shows a longitudinal section of one exemplary embodiment of a threaded drive system according to the present invention of the electromechanical brake pressure generator.

FIG. 3 shows a longitudinal section of one exemplary embodiment of threaded drive system 40 according to the present invention of electromechanical brake pressure generator 14. Threaded drive system 40 includes a housing 64, which forms a pot-shaped hydraulic cylinder 68. In this exemplary embodiment, housing 64 is made of metal. In addition, threaded drive system 40 includes a spindle nut 72, which is supported with the aid of a bearing 76 with respect to housing 64. Spindle nut 72 is driven by electric motor 38 shown in FIG. 2, which forms the drive. Spindle nut 72 thus carries out a rotary motion about its longitudinal axis. In one exemplary embodiment which is not shown, a spindle 80 (see FIG. 4) situated within spindle nut 72 may also be driven.

Figure 4:
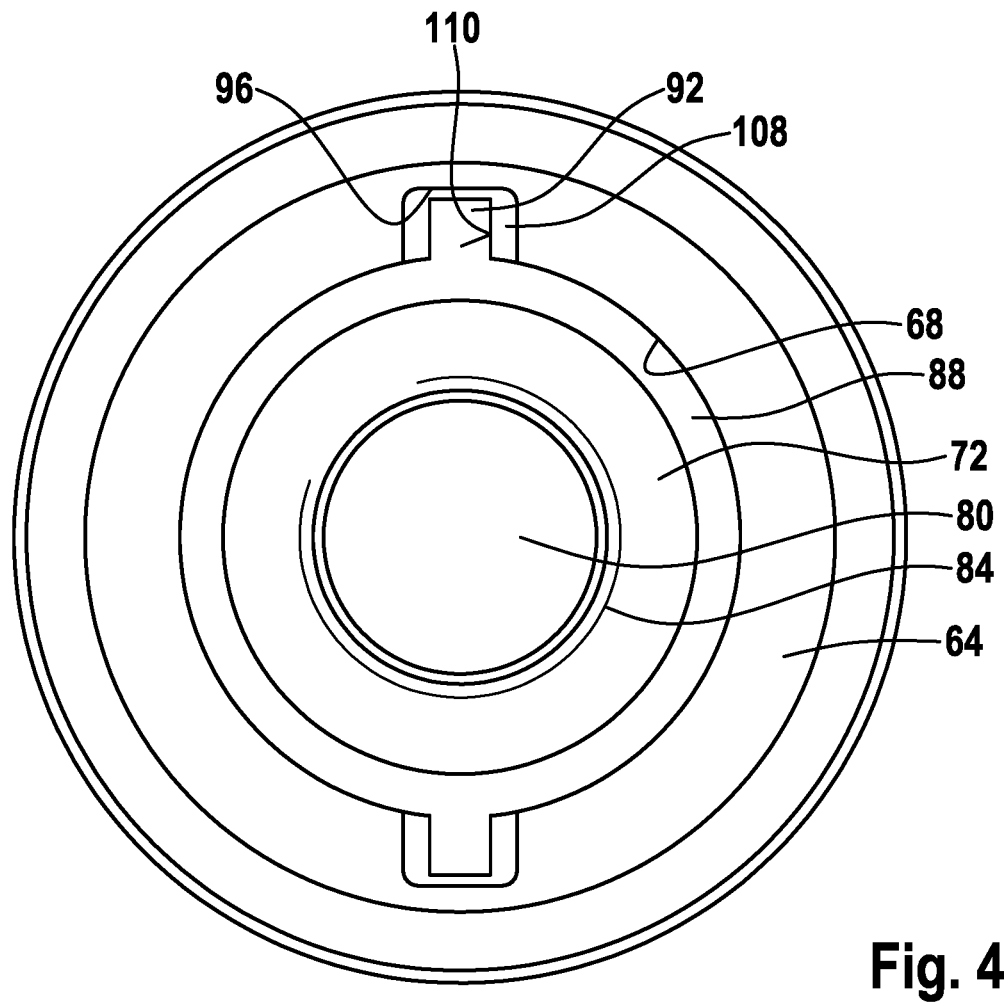
FIG. 4 shows a cross section through the threaded drive system according to FIG. 3.

FIG. 4 shows a cross section through threaded drive system 40 according to FIG. 3. Spindle 80 forms a thread 84 at which spindle nut 72 is situated and with which spindle 80 is in engagement. Spindle nut 72 essentially forms a hollow cylindrical body. Spindle nut 72 is surrounded by a pot-shaped hydraulic piston 88, which is situated in hydraulic cylinder 68. In contrast to spindle nut 72, hydraulic piston 88 is not in engagement with thread 72 of spindle 80. In this exemplary embodiment, hydraulic piston 88 is non-rotatably connected to spindle 80.

Radially outwardly extending sliding elements 92 are situated at two diametrically opposed sides of hydraulic piston 88, which engage in recesses 96 of housing 64 and form the anti-twist protection of spindle 80, which is non-rotatably connected to hydraulic piston 88. Recesses 96 shaped as grooves are formed in housing 64 as longitudinal grooves.

A width of sliding elements 92 of hydraulic piston 88 in the circumferential direction is slightly smaller than a width of recesses 96 of housing 64 formed in the circumferential direction. A length of sliding elements 92 in the axial direction is considerably smaller than a length of recesses 96 of housing 64. A rotation of spindle nut 72 holds spindle 80 with the aid of anti-twist protection 92, 96 of hydraulic piston 88 and housing 64, so that hydraulic piston 88 is movable with sliding elements 92 in the axial direction in housing 64 in the area across the length of recesses 96 of housing 64.

Gaskets 100a, 100b are situated between hydraulic piston 88 and hydraulic cylinder 68, as is shown in FIG. 4, so that a pressure is generatable in a working chamber 104 of hydraulic cylinder 68. As a result of a rotation of spindle nut 72, hydraulic piston 88 may be axially displaced with the aid of spindle 80 in the direction of working chamber 104, so that a brake fluid present in working chamber 104 may be pressurized. FIG. 4 additionally shows that a sliding rail 108 made of plastic, which forms a sliding surface 110 for sliding element 92, is introduced into recesses 96 of housing 64.

Figure 5:
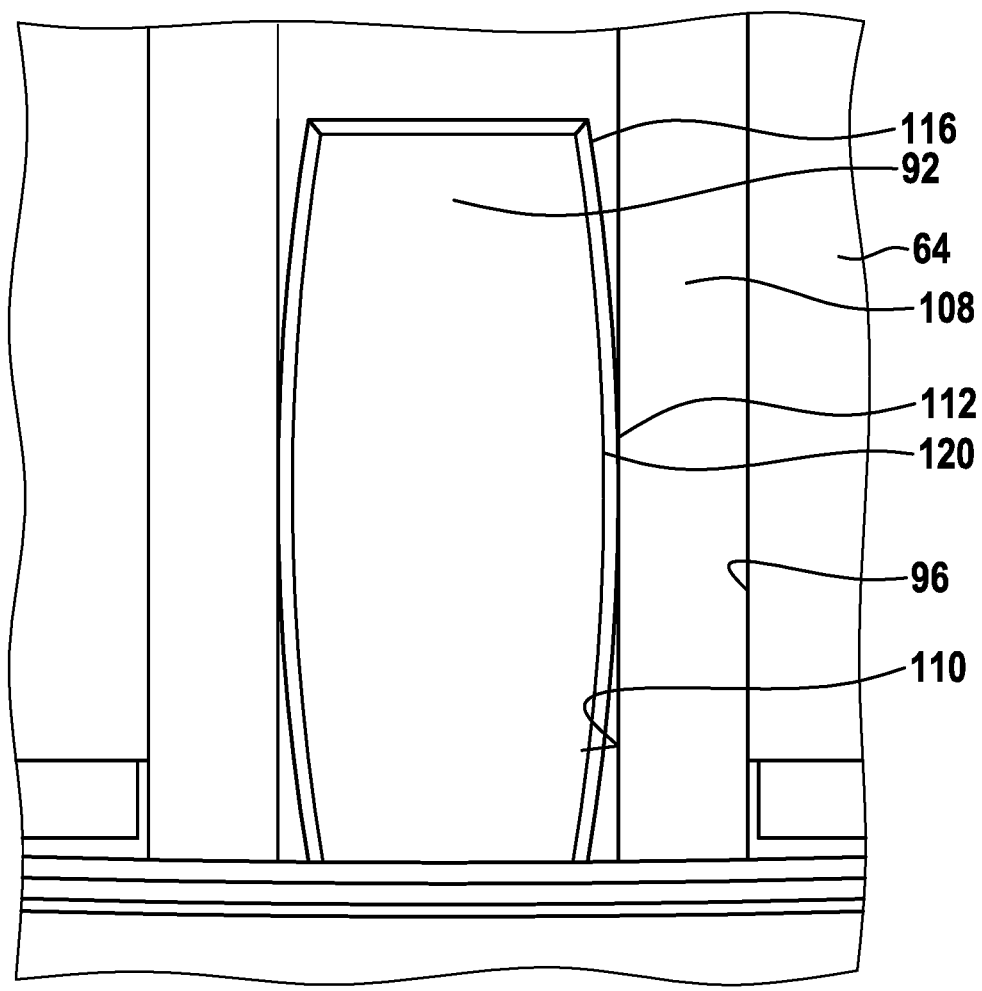
FIG. 5 shows a view of one exemplary embodiment of a sliding element.

FIG. 5 shows a view of one exemplary embodiment of sliding element 92. Sliding element 92 is shown in sliding rail 108. Sliding element 92 rests planarly against sliding surface 110 of sliding rail 108 in a contact area 112. In this way, a lower contact pressure is formed. As a result, the wear is reduced compared to a line contact, in which a high contact pressure is present. Sliding element 92 has a convex design in the axial direction of spindle 80 on axial edge areas 116. As a result, no edge loading occurs during a tilting of hydraulic piston 88, so that a low contact pressure may be permanently ensured. In addition, sliding element 92 also has a convex design in a radial direction of spindle 80 on radial edge areas 120. In this way, edge loading is also avoided.

Figure 6:
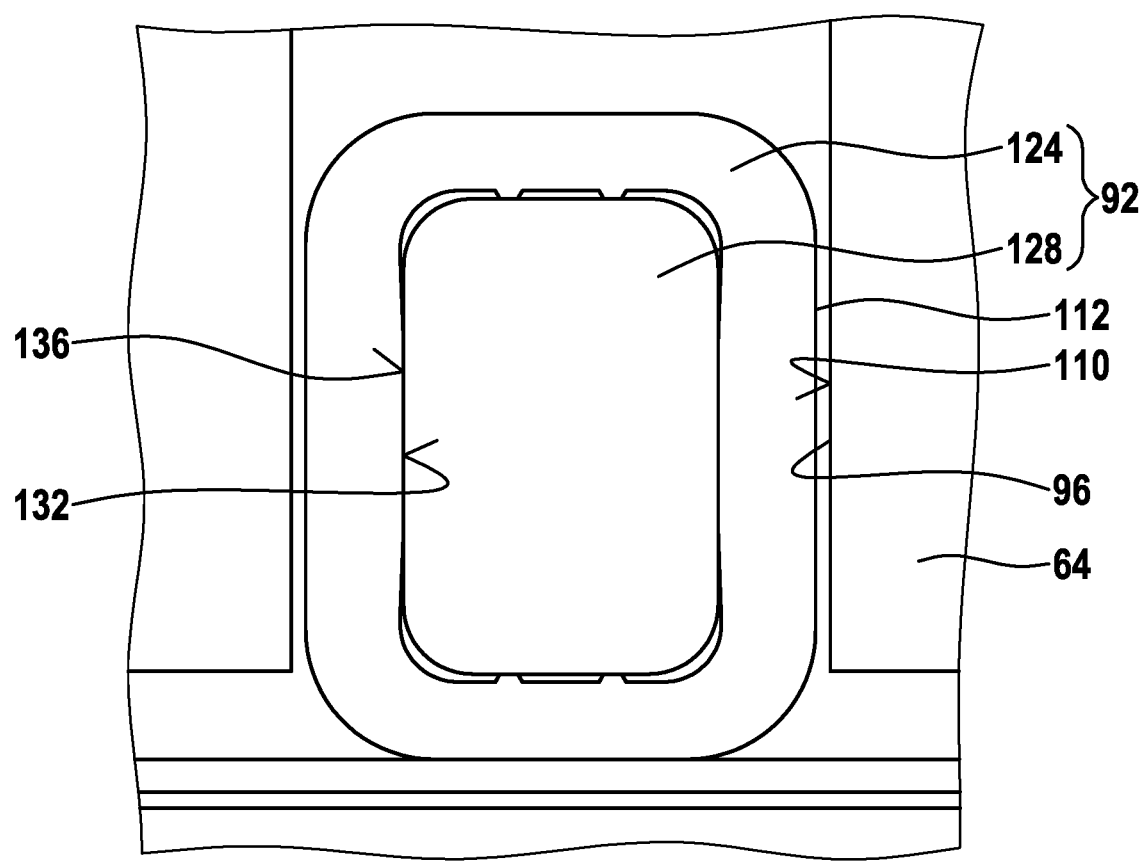
FIG. 6 shows a view of one further exemplary embodiment of a sliding element.

FIG. 6 shows a view of one further exemplary embodiment of a sliding element 92. In this figure, sliding element 92 is shown within recess 96 which forms sliding surface 110. This exemplary embodiment differs from the exemplary embodiment in FIG. 5 in that sliding element 92 additionally includes a contact shoe 124, which is made of plastic in this exemplary embodiment. Sliding element 92 is accordingly formed by an inner sliding element portion 128 and contact shoe 124. Contact shoe 124 surrounds inner sliding element portion 128 on the outer side. In contact area 112 with sliding surface 110, contact shoe 124 includes a flat surface with the aid of which contact shoe 124 rests planarly against the sliding surface 110.

Toward inner sliding element portion 128, contact shoe 124, in the axial direction to spindle 80, includes convex surfaces 132 on both sides. These convex surfaces 132 rest against planar surfaces 136 of inner sliding element portion 128. As a result, no edge loading occurs during a tilting of hydraulic piston 80. Nonetheless, a planar arrangement is ensured between sliding surface 110 and contact shoe 124, so that a low contact pressure may be permanently ensured.

In one exemplary embodiment which is not shown, it is also possible for inner sliding element 128 to include a convex surface 132, while contact shoe 124 rests thereagainst via a planar surface 136. In this way, the same above-described advantage is achieved.

What is claimed is:

1. An electromechanical brake pressure generator for a hydraulic braking system of a vehicle, comprising:
    at least one threaded drive system configured to convert a drive-side rotary motion into a translatory motion; and
    a piston/cylinder unit which includes a hydraulic piston actuatable by the threaded drive system for brake pressure generation, and a housing forming a hydraulic cylinder, wherein the hydraulic piston is in contact with brake fluid in a working chamber of electromechanical brake pressure generator and is configured to generate the brake pressure in the working chamber as a result of axial displacement of the hydraulic piston in a direction of the working chamber;
    wherein the threaded drive system includes:
        a spindle and a spindle nut which cooperate with one another via a thread; and
        an electromotive drive using which the spindle and the spindle nut are rotatable relative to one another;
    wherein the hydraulic piston of the piston/cylinder unit at least partially radially surrounds the spindle and the spindle nut, and the hydraulic piston is accommodated in the hydraulic cylinder of the piston/cylinder unit, creating an anti-twist protection, the anti-twist protection being formed by a recess in the housing at the hydraulic cylinder, the recess extending in an axial direction and forming a sliding surface, and the anti-twist protection further being formed by a sliding element extending from an outside surface of the hydraulic piston and protruding into the recess, the sliding element being configured in such a way that the sliding element rests against a planar contact area of the sliding surface so that the hydraulic piston is secured against twisting and is axially displaceable by a rotation of the spindle or the spindle nut;
    wherein the spindle is non-rotatably connected to the hydraulic piston, and the hydraulic piston and the spindle are axially displaced with a rotation of the spindle nut;
    wherein the sliding surface includes two respective planar sides facing each other, each of the two respective planar sides of the sliding surface contacting a respective side of the sliding element at a central convex portion of the respective side of the sliding element.

2. The electromechanical brake pressure generator as recited in claim 1, wherein the anti-twist protection is configured as a tongue-and-groove joint.

3. The electromechanical brake pressure generator as recited in claim 1, wherein the sliding surface is formed by a sliding rail inserted into the recess.

4. The electromechanical brake pressure generator as recited in claim 3, wherein the inserted sliding rail is made of a plastic material.

5. The electromechanical brake pressure generator as recited in claim 1, wherein the sliding element is made of a light metal alloy.

6. An electromechanical brake pressure generator for a hydraulic braking system of a vehicle, comprising:
    at least one threaded drive system configured to convert a drive-side rotary motion into a translatory motion; and
    a piston/cylinder unit which includes a hydraulic piston actuatable by the threaded drive system for brake pressure generation, and a housing forming a hydraulic cylinder;
    wherein the threaded drive system includes:
        a spindle and a spindle nut which cooperate with one another via a thread, wherein the spindle nut is formed as a separate part relative to the hydraulic piston; and
        an electromotive drive using which the spindle and the spindle nut are rotatable relative to one another;
    wherein the hydraulic piston of the piston/cylinder unit at least partially radially surrounds the spindle and the spindle nut, and the hydraulic piston is accommodated in the hydraulic cylinder of the piston/cylinder unit, creating an anti-twist protection, the anti-twist protection being formed by a recess in the housing at the hydraulic cylinder, the recess extending in an axial direction and forming a sliding surface, and the anti-twist protection further being formed by a sliding element extending from an outside surface of the hydraulic piston and protruding into the recess, the sliding element being configured in such a way that the sliding element rests against a planar contact area of the sliding surface so that the hydraulic piston is secured against twisting and is axially displaceable by a rotation of the spindle or the spindle nut;
    wherein the hydraulic piston is non-rotatably connected to the spindle nut, and the hydraulic piston and the spindle nut are axially displaced with a rotation of the spindle;

wherein the sliding surface includes two respective planar sides facing each other, each of the two respective planar sides of the sliding surface contacting a respective side of the sliding element at a central convex portion of the respective side of the sliding element.

7. An electromechanical brake pressure generator for a hydraulic braking system of a vehicle, comprising:
   at least one threaded drive system configured to convert a drive-side rotary motion into a translatory motion; and
   a piston/cylinder unit which includes a hydraulic piston actuatable by the threaded drive system for brake pressure generation, and a housing forming a hydraulic cylinder, wherein the hydraulic piston is in contact with brake fluid in a working chamber of electromechanical brake pressure generator and is configured to generate the brake pressure in the working chamber as a result of axial displacement of the hydraulic piston in a direction of the working chamber;
   wherein the threaded drive system includes:
      a spindle and a spindle nut which cooperate with one another via a thread; and
      an electromotive drive using which the spindle and the spindle nut are rotatable relative to one another;
      wherein the hydraulic piston of the piston/cylinder unit at least partially radially surrounds the spindle and the spindle nut, and the hydraulic piston is accommodated in the hydraulic cylinder of the piston/cylinder unit, creating an anti-twist protection, the anti-twist protection being formed by a recess in the housing at the hydraulic cylinder, the recess extending in an axial direction and forming a sliding surface, and the anti-twist protection further being formed by a sliding element extending from an outside surface of the hydraulic piston and protruding into the recess, the sliding element being configured in such a way that the sliding element rests against a planar contact area of the sliding surface so that the hydraulic piston is secured against twisting and is axially displaceable by a rotation of the spindle or the spindle nut;
      wherein the spindle is non-rotatably connected to the hydraulic piston, and the hydraulic piston and the spindle are axially displaced with a rotation of the spindle nut;
      wherein the sliding element includes a contact shoe which is situated on an outer side of the sliding element and is in contact with the sliding surface, the contact shoe completely circumferentially surrounding the sliding element and having a closed, rounded rectangular shape.

8. The electromechanical brake pressure generator as recited in claim 7, wherein the contact shoe is made of a plastic material.

9. The electromechanical brake pressure generator as recited in claim 7, wherein the contact shoe and an inner sliding element portion of the sliding element rest against one another via a planar surface of the contact shoe and a convex surface of the inner sliding element portion.

10. An electromechanical brake pressure generator for a hydraulic braking system of a vehicle, comprising:
    at least one threaded drive system configured to convert a drive-side rotary motion into a translatory motion; and
    a piston/cylinder unit which includes a hydraulic piston actuatable by the threaded drive system for brake pressure generation, and a housing forming a hydraulic cylinder;
    wherein the threaded drive system includes:
       a spindle and a spindle nut which cooperate with one another via a thread, wherein the spindle nut is formed as a separate part relative to the hydraulic piston; and
       an electromotive drive using which the spindle and the spindle nut are rotatable relative to one another;
       wherein the hydraulic piston of the piston/cylinder unit at least partially radially surrounds the spindle and the spindle nut, and the hydraulic piston is accommodated in the hydraulic cylinder of the piston/cylinder unit, creating an anti-twist protection, the anti-twist protection being formed by a recess in the housing at the hydraulic cylinder, the recess extending in an axial direction and forming a sliding surface, and the anti-twist protection further being formed by a sliding element extending from an outside surface of the hydraulic piston and protruding into the recess, the sliding element being configured in such a way that the sliding element rests against a planar contact area of the sliding surface so that the hydraulic piston is secured against twisting and is axially displaceable by a rotation of the spindle or the spindle nut;
       wherein the hydraulic piston is non-rotatably connected to the spindle nut, and the hydraulic piston and the spindle nut are axially displaced with a rotation of the spindle;
       wherein the sliding element includes a contact shoe which is situated on an outer side of the sliding element and is in contact with the sliding surface, the contact shoe completely circumferentially surrounding the sliding element and having a closed, rounded rectangular shape.

11. The electromechanical brake pressure generator as recited in claim 10, wherein the contact shoe is made of a plastic material.

12. The electromechanical brake pressure generator as recited in claim 10, wherein the contact shoe and an inner sliding element portion of the sliding element rest against one another via a planar surface of the contact shoe and a convex surface of the inner sliding element portion.

* * * * *